United States Patent [19]

Press

[11] 3,932,097

[45] Jan. 13, 1976

[54] RECORD MANUFACTURING EQUIPMENT

[76] Inventor: Lorence Press, 401 E. 86th St., New York, N.Y. 10028

[22] Filed: Jan. 30, 1975

[21] Appl. No.: 545,490

[52] U.S. Cl. ................ 425/407; 425/408; 425/810
[51] Int. Cl.² ........................................ B29D 17/00
[58] Field of Search .......... 425/407, 408, 810, 422, 425/116, 142

[56] References Cited
UNITED STATES PATENTS

| | | | |
|---|---|---|---|
| 1,576,642 | 3/1926 | Bishop | 425/408 |
| 2,317,839 | 4/1943 | Westin | 425/422 |
| 2,501,823 | 3/1950 | Leedom | 425/129 |
| 3,474,494 | 10/1969 | Damm et al. | 425/116 |
| 3,543,331 | 12/1970 | Rand et al. | 425/142 |
| 3,635,622 | 1/1972 | Wechsler | 425/116 |
| 3,830,459 | 8/1974 | Strausfeld | 425/407 X |

*Primary Examiner*—J. Howard Flint, Jr.

[57] ABSTRACT

Machinery for manufacturing a record which includes a first stamper and a second stamper. Means are associated with each stamper for cooling the stampers so the outer periphery of plastic that is formed into a record between said stampers solidifies and there is a minimum amount of flash.

5 Claims, 3 Drawing Figures

3,932,097

RECORD MANUFACTURING EQUIPMENT

BACKGROUND OF THE INVENTION

1. Field of the Invention

Record manufacturing equipment

2. Description of the Prior Art

All records are now manufactured by automatic machinery. Usually a record-making machine includes a lower record press platen and an upper record press platen. Mechanical means are provided for moving the record press platens towards each other. Attached to each record press platen is a record mold. Conduits extend through each record mold through which steam and a cooling liquid (e.g. water) are alternately passed.

A center hold down ring is provided for securing a record stamper to each record mold. Each record stamper stamps grooves on a side of the record. Usually each record stamper is provided with a conical edge and outwardly of said conical edge said record stamper slopes towards the record press platen with which it moves.

In molding a record, a plastic charge is placed between the upper record press platen and the lower record press platen when the respective record press platens are spaced apart from each other. The record press platens are brought immediately adjacent each other. Steam is directed through each record mold to increase the flow of the plastic. The movement of the stampers towards each other causes the plastic to fill the grooves of the respective stampers and flow outwardly. A cooling liquid is passed through the respective record molds to assist in cooling the plastic. Usually the plastic flashes beyond the edge of the stampers since it continues to flow radially outwardly as the stamping continues. This is undesirable in that the flash constitutes wasted material which is usually recycled.

It is extremely desirable for the time cycle for stamping a record be as low as possible for economic reasons. Still further, with many of the prior art record-pressing machines, there was a tendency for voids to be formed in the grooves not providing the desired fidelity. This, of course, was undesirable.

It is clear that if a record press machine could be devised which could minimize flash, have a low cycling time and minimize the amount of voids formed while providing better grooves that such a machine would find widespread use.

SUMMARY OF THE INVENTION

Purpose of the Invention

It is an object of the present invention to provide an improved record press machine.

Still another object of the present invention is to provide an improved record press machine which minimizes the amount of flash that is formed during a record pressing operation.

A further object of the present invention is to provide an improved record pressing machine which minimizes the formation of voids and provides better defined grooves than heretofore available with prior art record pressing machinery.

Another object of the present invention is to provide an improved record pressing machine which minimizes the amount of flash that is formed.

A further object of the present invention is to provide an improved record press machine capable of achieving the above and other objects and which is reliable in operation.

Still another object of the present invention is to provide means for modifying an existing record press machine so that the modified record press machine will be able to produce records having a minimum amount of flash, a low cycle time, a minimum amount of voids and well defined grooves.

Other objects in part will be obvious and in part will be pointed out hereinafter.

Brief Description of the Invention

According to the present invention, the foregoing as well as other objects are achieved by a record press machine including an upper record press platen and a lower record press platen. Secured to the upper record press platen is a first record mold and secured to the lower record press platen is a second record mold. The means of securing each record mold to its respective record press platen can be conventional.

Secured to the first record mold is a first record stamper which is designed so as to impress upon one side of a record of a certain sound. A center hold down is provided and extends through the center of the first record stamper and into a tapped opening in the first record mold.

A second record stamper is provided which is adapted to impress a second sound on the remaining side of a record to be molded. A center hold down is provided for securing the second stamper to the second record mold.

A first hold down ring is provided about the periphery of the first stamper and overlays a portion of said first stamper. A flow passage extends through the first hold down ring for a purpose that will soon be readily apparent.

In a similar fashion, an identical hold down ring is provided for the second stamper.

During a record pressing operation, a predetermined measured charge of plastic is located between the first and second stampers when said stampers are spaced apart from each other. As the distance between the platens is diminished, the plastic flows outwardly and the grooves on the respective stampers form grooves on the opposite sides of the record.

A cooling liquid is passed through the hold down rings which provides a relatively low temperature area for the outwardly flowing plastic to abut resulting in the outer periphery of the flowing plastic to solidify thereby minimizing flash. Since flash is minimized, the loss of plastic in an outward direction during molding is minimized. A greater force can be applied to the plastic so that deeper grooves can be formed on the opposite sides of the record with a corresponding reduction in the number of formed voids since none of the force is used to direct the plastic past the hold down rings.

The invention accordingly consists in the features of construction, combination of elements, and arrangement of parts which will be exemplified in the record manufacturing equipment hereinafter described and of which the scope of application will be indicated in the appended claims.

DESCRIPTION OF THE PREFERRED EMBODIMENT

Figure 1:
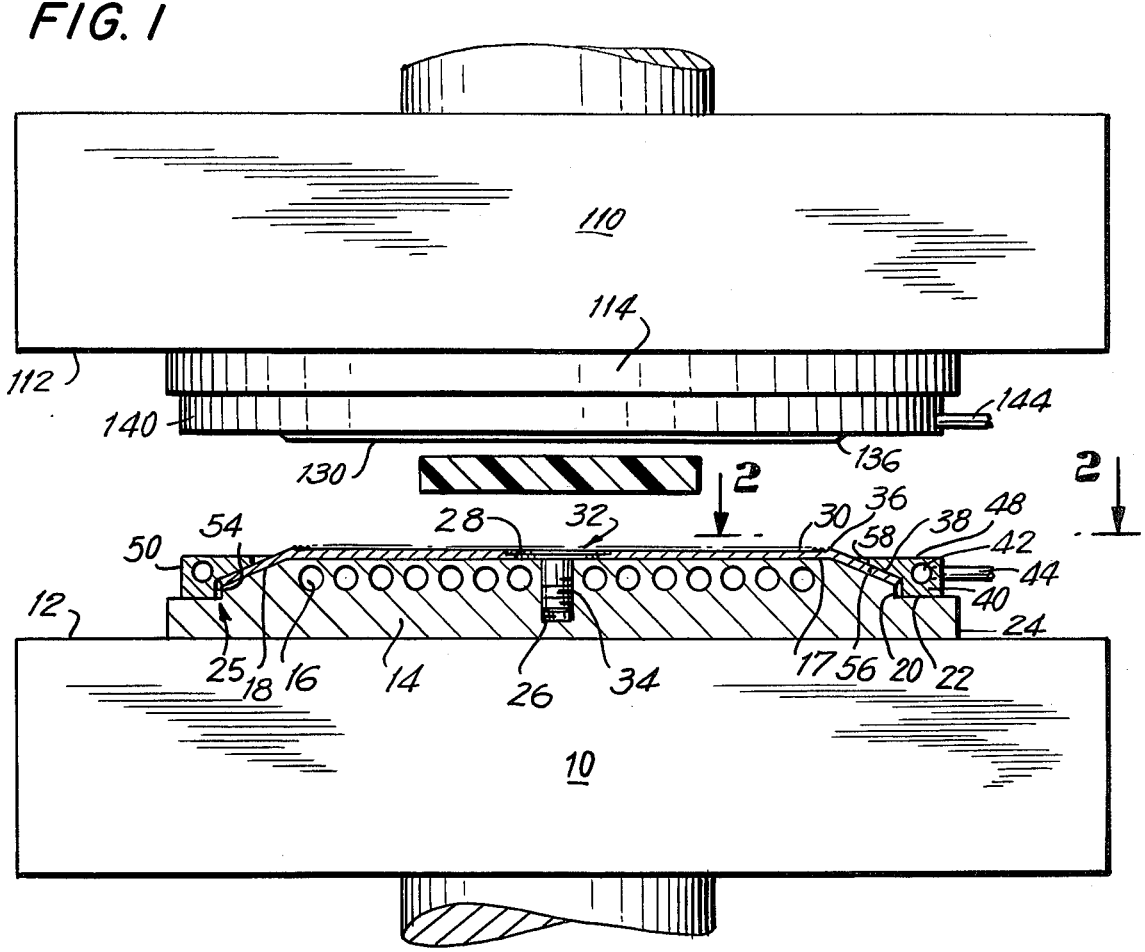
FIG. 1 is an exploded side elevational view of a record press machine according to the present invention.

In the drawings a record press machine according to the present invention is shown and includes a lower record press platen 10. Drive means is provided for elevating and lowering the record press platen and said drive means can be hydraulic or electric motor operated. Record press platen 10 is conventional and includes an upper surface 12. Secured to upper surface 12 of lower record press platen 10 is a record mold 14 which is circular. Extending through record mold 14 are passages 16 which are near the upper surface of record mold 14.

Passages 16 form a spiral with there being an inlet and an outlet for the respective ends of the spiral.

Record mold 14 includes an upper surface 17. Extending downwardly from upper surface 17 is a sloped annular surface 18 and extending downwardly from sloped annular surface 18 is an annular axial surface 20. Extending radially outwardly from surface 20 is an outwardly extending surface 22. Surfaces 20 and 22 define a shoulder 25. Depending downwardly from surface 22 is a vertical surface 24 which is annular and defines the outer extremity of record mold 14. Extending from surface 17 into the interior of record mold 14 is a tapped opening 26.

Located on top of surface 17 is a record stamper 30. Record stamper 30 includes grooves on its upper surface which are used to form the grooves on a record in the conventional manner. Stamper 30 includes a stepped central opening. A central hold down 32 is provided which includes a shaft 34. Center hold down 32 is located so that the head 35 thereof is received on the step of the stepped central opening of stamper 30 and the shaft is threaded into opening 28. The head of center hold down 32 includes a shoulder which mates with the step on the portion of stamper which defines the central opening and the stamper is firmly secured to record mold 14.

Located near the periphery of record stamper 30 is a conical edge 36 which is slightly elevated above the central portion of record stamper 30. Sloping towards record press platen 10 from conical edge 36 is a sloping surface 38.

Figure 3:
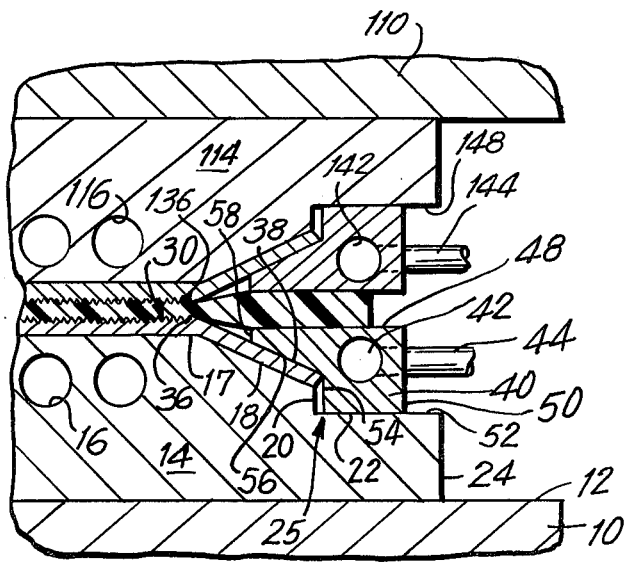
FIG. 3 is a sectional view taken substantially along the line 3—3 of FIG. 2.
Figure 2:
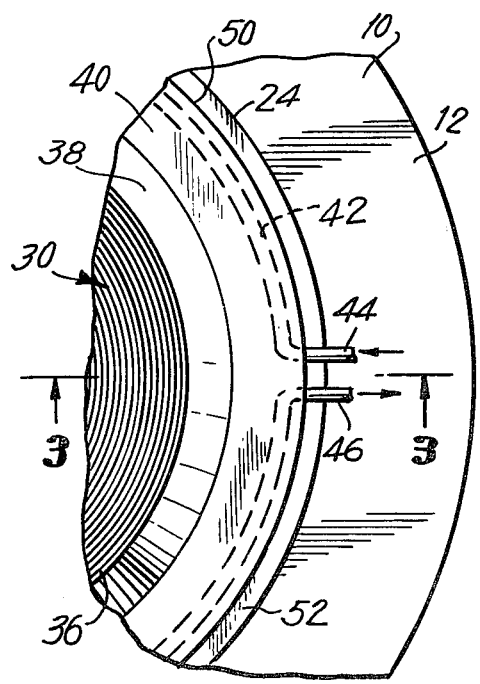
FIG. 2 is an enlarged sectional view taken substantially along the line 2—2 of FIG. 1.

A hold down ring 40 is provided which is annular in configuration. Hold down ring 40 includes a cross section such as shown in FIG. 3 and extending through said hold down ring is a passageway 42. Passageway 42 at its opposite ends is connected to tubes 44 and 46 for a purpose that will soon be readily apparent. Hold down ring 40 includes an upper surface 48 which is slightly below the upper surface of stamper 30 for the orientation of FIG. 3. Several bolts are provided which extend through bolt clearance holes in hold down ring 40. Each bolt is in threaded engagement with a tapped opening in the periphery of record mold 14 so that the hold down ring is securely fastened to the record mold.

It is to be appreciated that hold down ring 40 includes an outside surface 50 which is perpendicular to surface 22 of mold 14. Still further, hold down ring 40 includes a base surface 52 which contacts surface 22 of record mold 14. Extending upwardly from the inner surface of base surface 52 on hold down ring 40 is a vertical annular surface 54 which is spaced from surface 20. Extending radially inwardly and upwardly from vertical annular surface 54 is an inclined surface 56 which rests against sloping surface 38 of stamper 30. A vertical surface 58 extends outwardly from surface 54 to surface 48.

An upper record press platen 110 is provided and has associated therewith the same structure (i.e. record mold, stamper, center hold down and hold down ring) as is associated with the lower record press platen. The structure associated with the upper record press platen has the same reference numerals for the corresponding structure associated with the lower record press platen only the reference numerals for the structure associated with the upper record press platen are prefaced by the number 1. Some of the structure associated with the upper record press platen is not shown in the drawings but is referred to hereinafter by its appropriate reference numeral. The upper stamper is identified by reference numeral 130 whereas the stamper associated with record press platen 10 is identified by reference numeral 30, etc.

It is to be appreciated that stamper 30 is used to stamp one side of the record (e.g. side "A") whereas stamper 130 is used to form the grooves on the other side of the record (e.g. side "B").

In operation, the record press platens are spaced apart from each other and a charge of plastic is placed between the respective stampers. Steam is directed through passages 16 and 116 and the distance between the record press platens is diminished. A cooling fluid continuously circulates through passages 42 and 142 as the plastic is compressed between the stampers. The plastic is subjected to a high pressure and heat and is forced outwardly becoming thinner and thinner. After the plastic has become relatively thin, a cooling liquid is passed through passages 16 and 116 to assist in cooling the plastic. The cooling liquid in passages 42 and 142 ensures that as the plastic moves outwardly above surfaces 48 and 148 the plastic solidifies. The conical edges 36 and 136 never touch and since the plastic solidifies there is a minimum of flash, i.e. waste material outside of the hold down ring. Since the outer periphery of the plastic solidifies, the continued diminishing of the distance between the stampers results in the formation of deep grooves on the opposite sides of the plastic. This is because since the plastic can no longer flow outwardly as the distance between the stampers diminishes, the full force of the stampers is applied to the plastic in forming grooves and not in forcing the plastic outwardly. The result is deep grooves with less voids that provides a high quality record.

Using the structure of the present invention a faster cycle is obtainable than with conventional record manufacturing machinery.

It is to be appreciated that each hold down ring, in addition to solidifying the plastic as it flows outwardly, also serves the important function of preventing the outside periphery of the stamper it is associated with from freely moving.

It thus will be seen that there is provided record manufacturing equipment which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. Machinery for manufacturing a record comprising a first record press platen, a first record mold secured to said first record press platen, a first stamper having a central portion and a periphery, a second record press platen, a second record mold, said second record mold secured to said second record press platen, a second stamper having a central portion and a periphery, means for securing a first portion of said first stamper to said first record mold, means for securing the periphery of said first stamper to said first record mold and for cooling the outer periphery of plastic that is being formed into a record between said first and second stampers during a stamping operation, means for securing a first portion of said second stamper to said second record mold, and means for securing the periphery of said second stamper to said second record mold and for cooling the outer periphery of plastic that is being formed into a record between said first and second stampers during a stamping operation.

2. Machinery according to claim 1 wherein said means for securing the periphery of said first stamper to said first record mold includes a first hold down ring, said first hold down ring holding the periphery of said first stamper in contact with said first record mold, and fluid passage means extending through said first hold down ring.

3. Machinery according to claim 2 wherein said first hold down ring includes a surface that is flush with the periphery of said stamper.

4. Machinery according to claim 2 wherein said first hold down ring includes an upper surface spaced from said first record press platen, said first stamper including a central portion parallel to said first record press platen, said first stamper central portion being parallel to said hold down ring upper surface and spaced further from said first record press platen than said first hold down ring upper surface.

5. Machinery according to claim 2 wherein said means for securing the periphery of said second stamper to said second hold down ring and for cooling the outer periphery of plastic that is being formed into a record between said first and second stampers during a stamping operation is identical to said means for securing the periphery of said first stamper to said first record mold and for cooling the outer periphery of plastic that is formed into a record between said first and second stampers during a stamping operation.

* * * * *